United States Patent

Chen et al.

[11] Patent Number: 5,168,732
[45] Date of Patent: Dec. 8, 1992

[54] AUTOMOBILE STEERING LOCK

[75] Inventors: Tian-Yuan Chen, No. 95-4, Min Hsiang Street, Chung Heh Shih, Taipei Hsien; Hsieh Ta-Yung, Tainan, both of Taiwan

[73] Assignee: Tian-Yuan Chen, Taiwan

[21] Appl. No.: 808,002

[22] Filed: Dec. 16, 1991

[51] Int. Cl.⁵ .................................. B76R 25/02
[52] U.S. Cl. .............................. 70/209; 70/226
[58] Field of Search ............... 70/209, 211, 212, 225, 70/226, 237, 238

[56] References Cited

U.S. PATENT DOCUMENTS

| | | | |
|---|---|---|---|
| 1,429,334 | 9/1922 | Furber | 70/209 |
| 1,448,658 | 3/1923 | Furber | 70/209 |
| 3,828,593 | 8/1974 | Bolton | 70/209 |
| 4,444,030 | 4/1984 | Dausch | 70/209 |
| 4,829,797 | 5/1989 | Wu | 70/209 |
| 4,882,920 | 11/1989 | Wu | 70/209 |
| 5,052,201 | 10/1991 | Liou | 70/209 |
| 5,095,723 | 3/1992 | Lin | 70/209 |

FOREIGN PATENT DOCUMENTS 631708  6/1936  Fed. Rep. of Germany ........ 70/209

Primary Examiner—Renee S. Luebke
Assistant Examiner—D. M. Boucher
Attorney, Agent, or Firm—Bacon & Thomas

[57] ABSTRACT

An antitheft device for attachment to a steering wheel of an automobile comprising a trough member defining a trough with an open top for engaging from under a section of the steering wheel, a handle secured to a shaft and rotatable between a locking position with the handle extending radially outwardly across the open top of the trough and an unlocking position with the handle removed from the trough and a lock mechanism associated with the trough member to lock the handle in the locking position.

2 Claims, 6 Drawing Sheets

5,168,732

AUTOMOBILE STEERING LOCK

FIELD OF THE INVENTION

The present invention relates to an automobile antitheft device, and more particularly to a device for attachment to an automobile steering wheel to prevent complete rotation thereof for securing against unauthorized driving.

BACKGROUND OF THE INVENTION

Antitheft devices which attach to an automobile steering wheel have been known heretofore, as shown in U.S. Pat. Nos. 4,738,127, 4,887,443 and 4,935,047. Such antitheft devices for attachment to a steering wheel of an automobile includes an elongated body member having a passage extending along an axis therethrough, an elongated rod member adapted to move in telescopic fashion in the passage of the body member along the axis, opposed hooks for engaging the inside portions of the steering wheel and lock means associated with the body member engaging the rod within the passage for locking the rod member stationary with respect to the body member at any of a plurality of positions. While the antitheft devices described above are functional, they include several defects. For example, these antitheft devices are both long and heavy and not convenient in carrying. Moreover, the locking operation by telescoping the devices may injure the passenger sitting next to the driver.

It is accordingly a primary object of this invention to provide an automobile steering lock that overcomes the foregoing defects associated with prior art devices.

Another object of this invention is to provide an automobile steering lock that is small in size, light in weight and easy to operate.

DETAILED DESCRIPTION OF A PREFERRED EMBODIMENT

Figure 3:
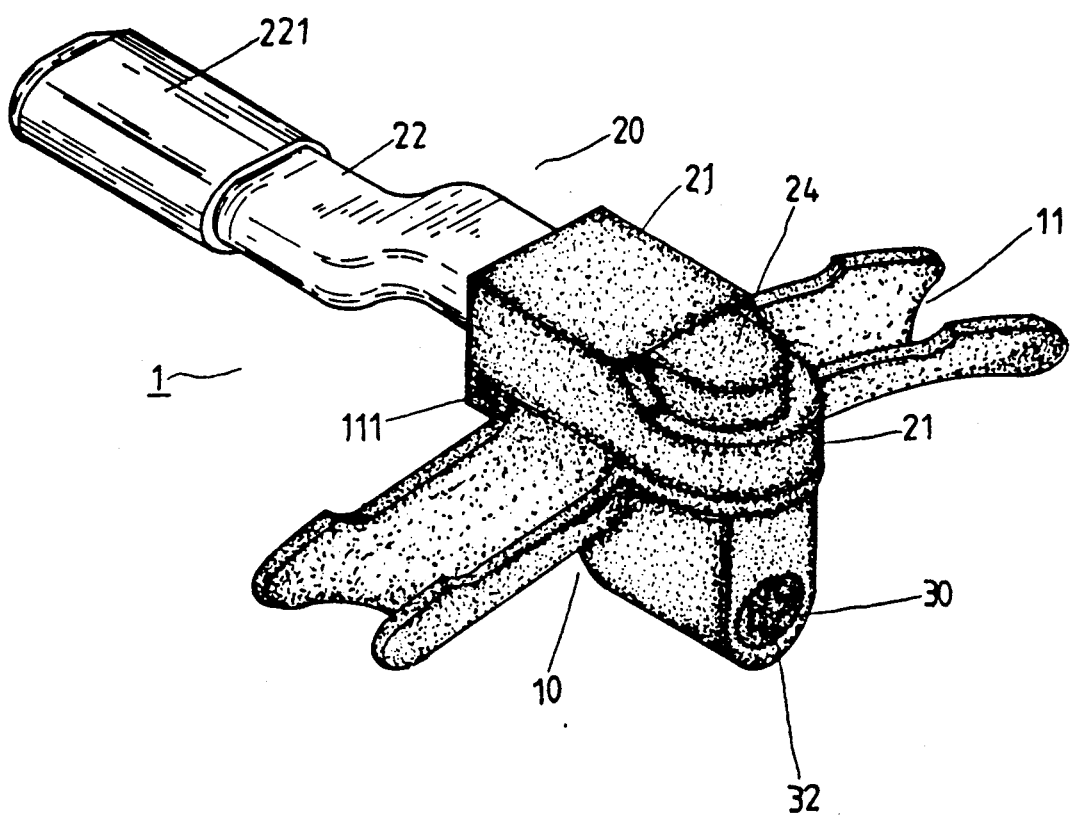
FIG. 3 is a perspective view of the device shown in an FIG. 2.
Figure 4:
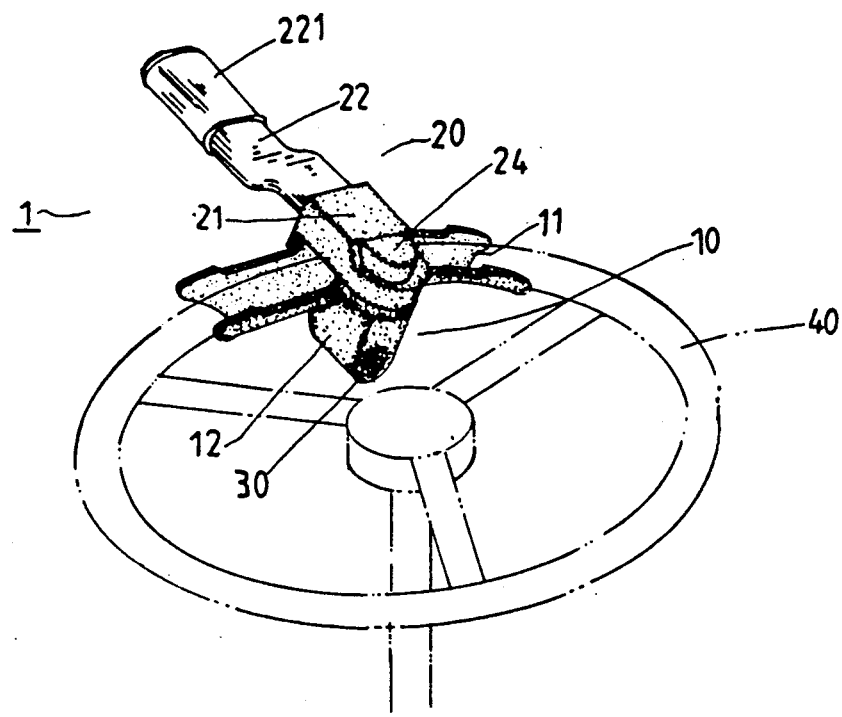
FIG. 4 is a perspective view of the device shown in a position when mounted on a steering wheel.

Referring now to the drawings wherein the showings are for the purpose of illustrating a preferred embodiment of the invention only and not for the purpose of limiting same, in FIGS. 3 and 4, an automobile steering lock according to the present invention is generally designated by numeral 1 and, broadly stated, comprised of a slightly curved trough member 11 adapted to engage from under a section of a steering wheel 40, an operating handle assembly 20 having a head member 21 turnable between a first locked position and a second unlocked position and a lock mechanism 10 operable to lock the head member 21 of the operating handle assembly 20 in its first locked position.

Figure 1:
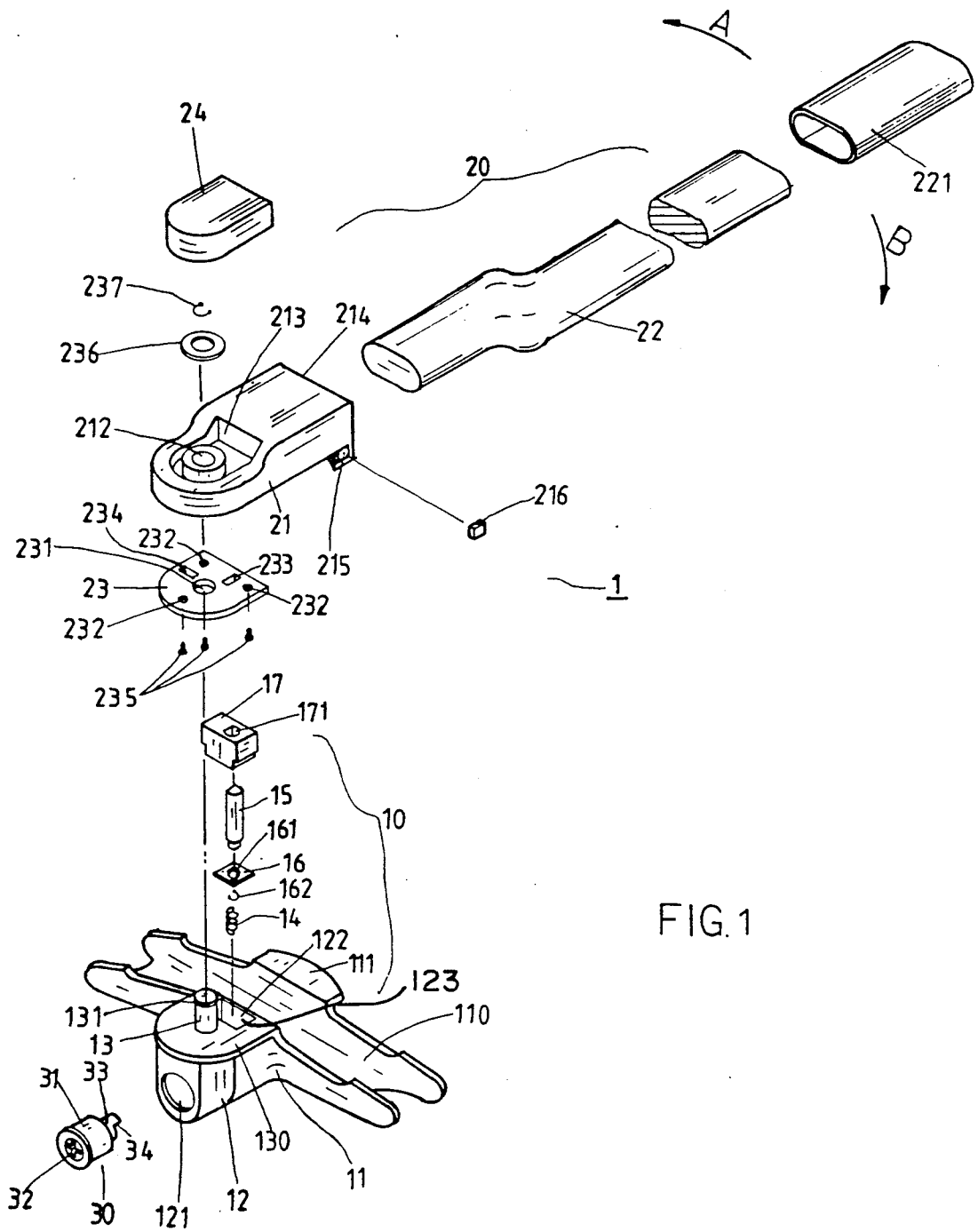
FIG. 1 is an exploded perspective view illustrating a preferred embodiment of an antitheft device of the present invention.
Figure 2:
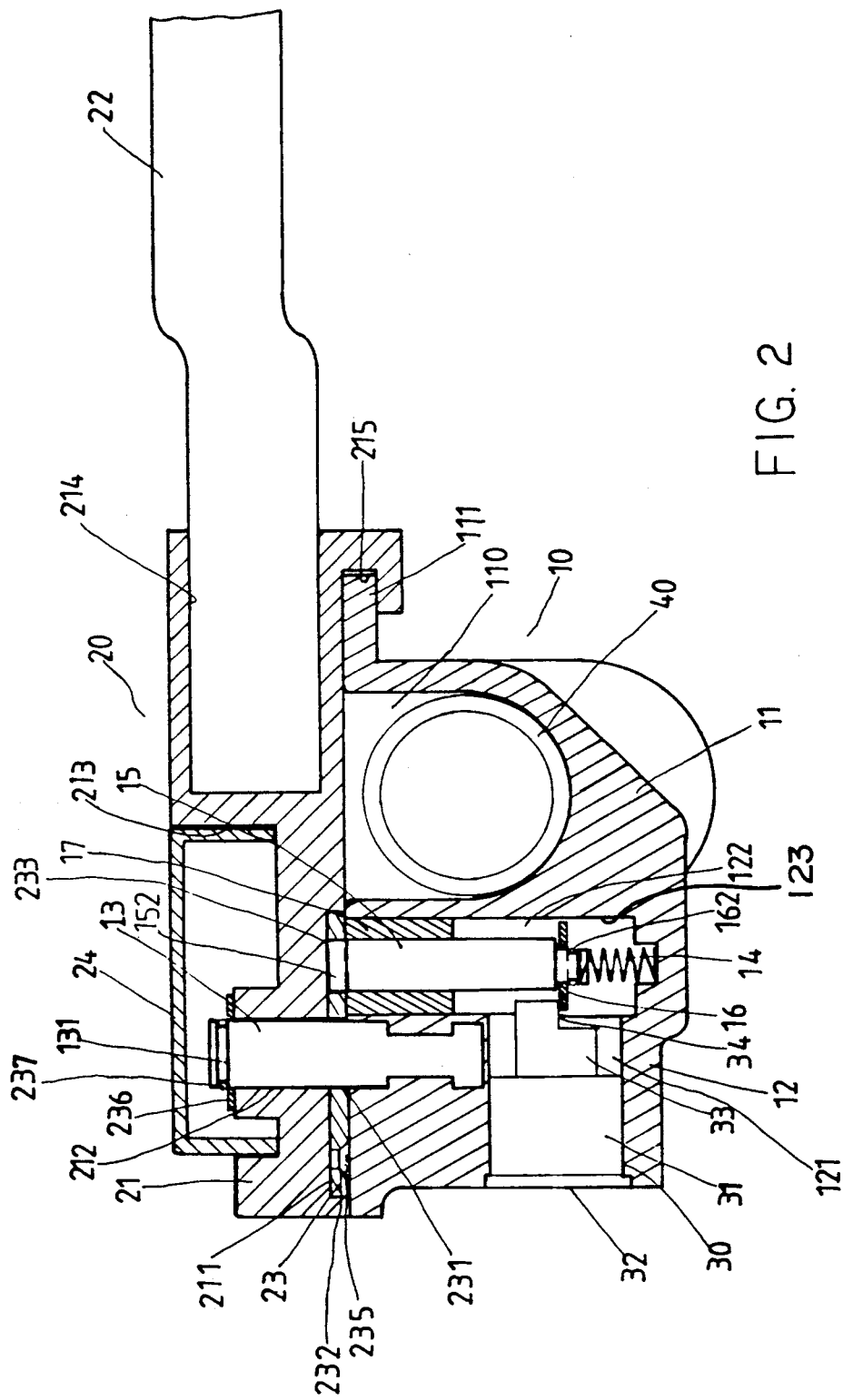
FIG. 2 is a cross-sectional view of the device shown in FIG. 1 in assembled and locked condition.

As shown in FIGS. 1 and 2,. ,the, trough member 11 includes two parallel side walls which define a slightly curved groove 110 to engage from under a section of a steering wheel, a housing 12 extending inwardly from a middle portion of the inner side wall and a lip member 111 extending outwardly from a middle portion on the top end of the outer side wall.

The housing has a base 130 on top of which is formed with a rectangular opening 122. A spindle 13 extends from a central portion of the base 130 and includes a circumferentially formed groove 131. A cylindrical passage 121 extends radially from a front side wall into the housing 12 for firmly receiving a lock cylinder 30 which has a front surface flush with the surface of the front side wall of the housing 12.

Figure 7:
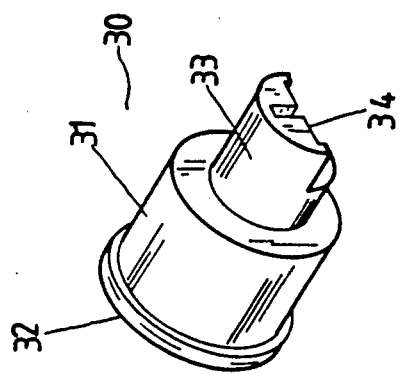
FIG. 7 is an enlarged perspective view of a key lock cylinder to be used in the device.

As best shown in FIG. 7, said lock cylinder 30 has a projection 33 which is basically a half-cylinder extending from a cylindrical body 31. The projection 33 has a surface 34 which is arranged to actuate a locating means so as to lock or unlock this device that is to be described later. The lock cylinder 30 is provided with a key guide 32 into which a key (not shown) is inserted to rotate the projection 33. A vertical chamber 123 extends downwardly from the rectangular opening 122 of the base 130 into the housing 12 to communicate the cylindrical passage 121.

The locating means includes a guide block 17 which is adapted to be press-fitted in the vertical chamber 123 and defines a vertical passage 171, and a locating member 15 adapted to pass through the vertical passage 171 of the guide block 17 and slide along a vertical direction.

Figure 8:
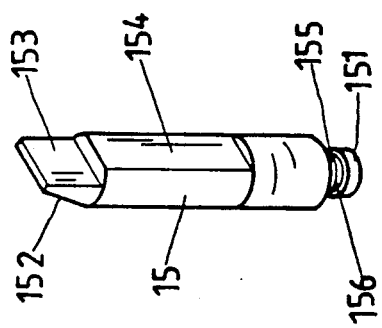
FIG. 8 is an enlarged perspective view of a locating member to be used in the device.

As best shown in FIG. 8, said locating member 15 has a tenon top end defined by a slope side wall 152 and a vertical side wall 153, a major vertical side wall 154 on a major portion of the locating member 15 to prevent rotation and permit sliding movement only of the locating member 15 within the vertical passage 171 and a bottom end 151 circumferentially formed with a groove 156 and having a neck portion 155. The diameter of the bottom end 151 is smaller than the diameter of the rest of the locating member 15 so that the bottom end can pass through a central opening 161 of a plate 16 and keep the plate 16 around the neck portion 155. Said plate 16 is secured in position by a resilient clamp 162 being engaged in the groove 156. A coil spring 14 is mounted in the housing 12 with an upper end sleeving around the bottom end 151 of the locating member 15 and a lower end disposed in a recess which is formed in a bottom inner side wall of the housing 12 and aligned with the vertical passage 171, as seen in FIG. 2.

The head member 21 of the operating handle assembly 20 is formed with a recess (as best shown in FIG. 2) and a plurality of blind screw holes (not shown) for accommodating and mounting a locating plate 23 with cap screws 235 through a plurality of openings 232 formed in the locating plate 23. The locating plate 23 is also provided with a central hole 231 in alignment with an axle hole 212 in the head member 21 for turnably mounting the locating plate 23 and the head member 21 on the spindle 13 and securing them in their positions with a washer 236 and a resilient clamp 237 which is engaged in the groove 131 of the spindle 13. The locating plate 23 is further provided with two stop holes 233, 234, spaced 90 degrees apart, each of which has an inner surface to be engaged by the surface 153 of the tenon end of the locating member 15, as will be described in more detail hereafter to prevent rotation of the operating handle assembly 20.

The rear end of the head member 21 is formed with a recess 214 for firmly receiving a frontal portion of a handle 22 and a handle grip 221 is provided at the rear end of the handle 22. A depression 213 is formed in the top portion of the head member 21 and a cover 24 is fittedly mounted on the depression 213 to enclose the spindle 131, washer 236 and the clamp 237. The rear bottom of the head member 21 is extended below the bottom side and then bent inwardly to define a guide groove 215 which allows the lip member 111 to pass along and a limiting body 216 is disposed within the guide groove 215 to engage a side surface of the lip member 111 when the head member 21 is turned to its locked position.

Figure 6:
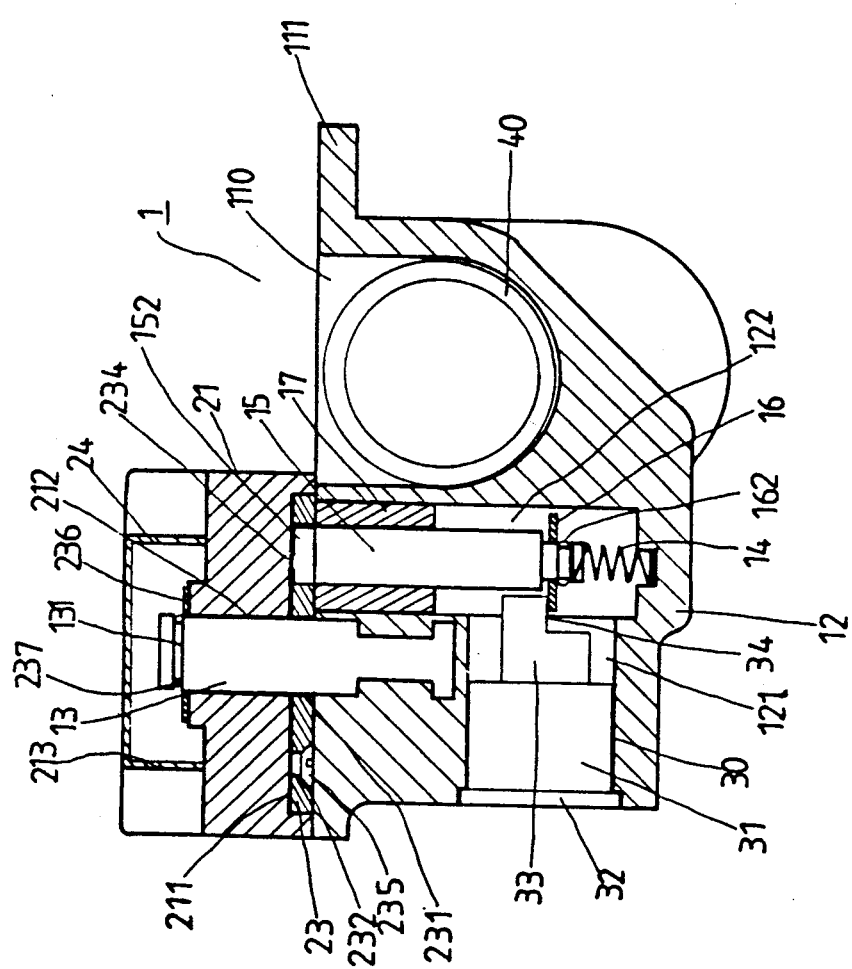
FIG. 6 is a cross-sectional view of the device shown in FIG. 5.

The operation of the present invention will now be described with particular reference to FIGS. 2 and 6. With lock cylinder 30 disposed in the position illustrated in FIG. 2, the tenon top end of the locating member 15 is protruded into the stop hole 233, thereby the head member 21 is locked in its first position whereas the head member 21 extends radially across the trough member 11 so that a section of the steering wheel 40 is locked within the trough member 11. The handle 22 of the operating handle assembly 20 now extends radially outwardly from the steering wheel 40 to prevent a complete rotation of the steering wheel 40.

Figure 5:
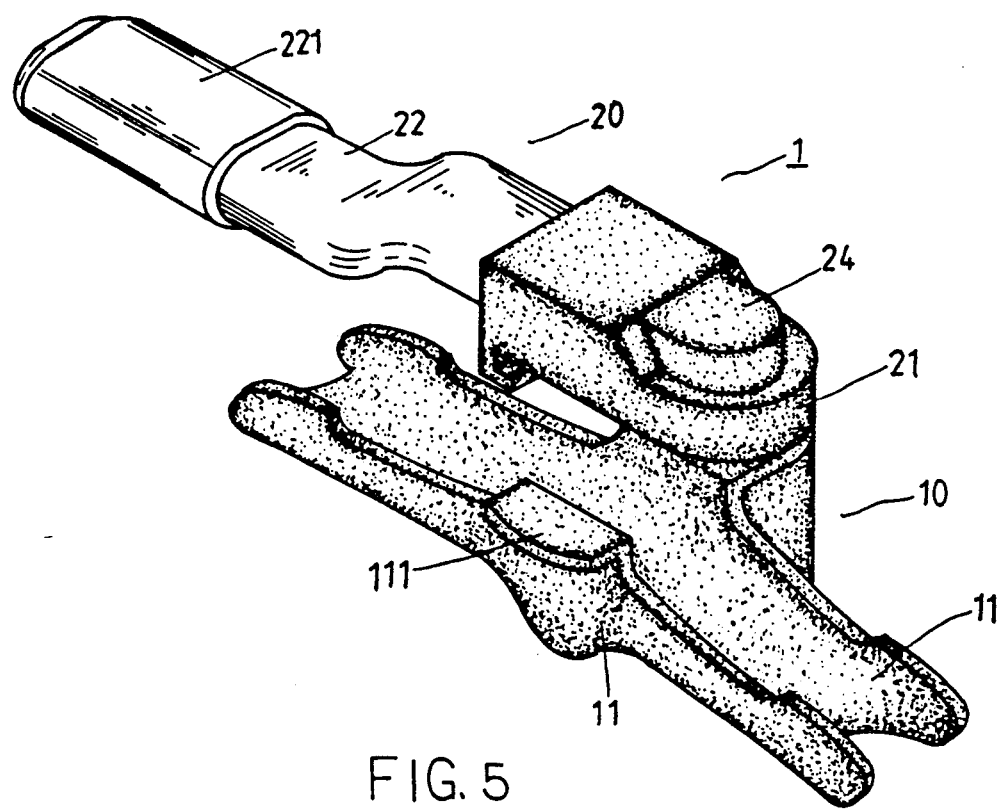
FIG. 5 is a perspective view of the device in an unlocked condition.

To unlock this device, the projection 33 can be turned along either of its rotating directions with a matching key (not shown) in 90 degrees that press the plate 16 to bias the locating member 15 downwardly whereas the tenon end of the locating member 15 is withdrawn from the stop hole 233 into the vertical passage 171 of the guide block 17 to unlock this device 1. Under such unlocked condition, the operating handle assembly 20 is turnable about the spindle 13 to its second position, as best shown in FIGS. 5 and 6, where the head member 21 is removed from the trough 110, thus permitting the steering wheel 40 to be disengaged from the trough member 11. In this second position, the locating member 15 is aligned with stop hole 234 and is automatically urged by the compressed coil spring 14 to protrude its tenon end into the stop hole 234.

The present invention, as exemplified by the preferred embodiment disclosed herein, is an improved automobile steering lock that is essentially smaller in size and lighter in weight than known locks of this type. The small size and light weight of the present invention facilitate carrying of this antitheft device. It is understood that modifications can be made to the invention without departing from the spirit and scope of the claims.

We claim:
1. An antitheft device for attachment to a steering wheel of an automobile comprising:
   a) a trough member including a base and a pair of parallel inner and outer sidewalls defining an open top trough for engaging a section of a steering wheel from the underside thereof;
   b) a housing member attached to the inner sidewall of the trough member, the housing member including a first chamber extending radially and a second chamber extending axially downwardly from a top surface of the housing member, the first and second chambers being disposed in communication with each other.
   c) a lock cylinder received within the first chamber and including an integral projection rotatable between a locking position and an unlocking position;
   d) a handle assembly secured to the top of the housing member for rotatable movement between a steering wheel engagement position wherein the handle extends radially outwardly across the open top of the trough and a steering wheel release position wherein the handle is positioned away from the open top of the trough;
   e) a first slot formed in a bottom of the handle assembly, the first slot being alignable with the second chamber when the handle is in its steering wheel engagement position;
   f) a locating member slidably received in the second chamber, the locating member including a tenon member at a first end thereof, a spring member disposed in the second chamber and engaging a second end of the locating member for urging same outwardly, a flange carried by the second end of the locating member for engagement by the integral projection of the lock cylinder; and
   g) wherein when the integral projection is rotated into the locking position, the tenon member is disposed into engagement within the first slot of the handle, and when the integral projection is rotated into the unlocking position, the tenon member is disengaged from the first slot of the handle.

2. The antitheft device of claim 1 further including a second slot formed in a bottom of the handle assembly, the second slot being circumferentially spaced from the first slot and alignable with the second chamber in the housing chamber for engagement by the tenon member in the unlocking position.

* * * * *